United States Patent [19]

Schafer et al.

[11] Patent Number: 5,072,426

[45] Date of Patent: Dec. 10, 1991

[54] SELF-MONITORING SHOCK WAVE HYDROPHONE

[75] Inventors: Mark E. Schafer, Norristown; Timothy L. Kraynak, Hatboro, both of Pa.

[73] Assignee: Sonic Technologies, Horsham, Pa.

[21] Appl. No.: 652,671

[22] Filed: Feb. 8, 1991

[51] Int. Cl.$^5$ .............................................. H04B 17/00

[52] U.S. Cl. ...................................... 367/13; 367/164; 73/609; 310/337/800

[58] Field of Search ................................. 73/609-612; 367/12, 157, 160-165, 191; 310/337, 800

[56] References Cited

U.S. PATENT DOCUMENTS

| | | | |
|---|---|---|---|
| 3,327,071 | 6/1967 | Bonk | 367/13 |
| 4,433,400 | 2/1984 | DeReggi et al. | 367/163 |
| 4,445,361 | 5/1984 | Moffett et al. | 367/13 X |
| 4,653,036 | 3/1987 | Harris et al. | 367/170 |
| 4,734,611 | 3/1988 | Granz | 310/324 |
| 4,764,905 | 8/1988 | Granz et al. | 367/140 |
| 4,803,671 | 2/1989 | Rochling et al. | 367/166 |
| 4,813,415 | 3/1989 | Reichenberger et al. | 128/328 |

OTHER PUBLICATIONS

Everback: "An Inexpensive Wide-Bandwidth Hydrophone for Lithotripsy Research", 87 J. Acoustical Soc'y of America, p. S128 (2/28/90).

Lewin: "Minature Piezoelectric Polymer Ultrsonic Hydrophone Probes," 19 Ultrasonics, pp. 213-216 (May 29, 1981).

Platte: "A Polyvidylidene Fluoride Needle Hydrophone for Ultrasonic Applications", 23 Ultrasonics, pp. 113-118 (May, 1985).

Lewin et al.: "Factors Affecting the Choice of Preamplification for Ultrasonic Hydrophone Probes", vol. 13, No. 13, Ultrasound in Medicine and Biology, pp. 141-148.

*Primary Examiner*—Brian S. Steinberger

*Attorney, Agent, or Firm*—Arent, Fox, Kintner, Plotkin & Kahn

[57] ABSTRACT

The present invention relates to a hydrophone specifically designed for use in high pressure shock wave fields, comprising a thin piezoelectric polymer film secured to a rigid hoop structure, having a centrally located active element and two conducting leads extending from the active element on each side of the film. Under the action of high pressure shock waves, the conductive material which makes up the active area electrode and the conductive leads is slowly removed, altering the hydrophone's sensitivity and eventually rendering it unusable. The present invention provides an improved design for a hydrophone which monitors the loss of electrode and lead integrity due to shock wave action so that the hydrophone may be replaced before it produces invalid readings. The leads on each side of the centrally located active element are electrically switched to measure the resistance between the leads and the central portion. In another embodiment, the film may be a disposable item allowing for rapid replacement once damaged.

15 Claims, 5 Drawing Sheets

SELF-MONITORING SHOCK WAVE HYDROPHONE

BACKGROUND OF THE INVENTION

The present invention relates to hydrophones, and more particularly to hydrophones employing piezoelectrically active elements of the polymer membrane type. The hydrophone is primarily intended for use in high pressure amplitude acoustic shock wave field measurements There is a need for precise, quantitative measurement of high amplitude ($10^8$ Pa) acoustic pressure distributions or shock wave fields which are present, for example, in the focal region of lithotripters. Such lithotripters use focused ultrasonic shock waves to shatter concretions such as kidney stones in the kidney of a patient. Quantification of these shock wave fields is necessary for determining the safety and performance characteristics of these hydrophones.

These shock wave fields possess very steep shock wave fronts with rise times well below 1 μs and, in some instances, very small focal volumes (the region in which the pressure is greater than one half the maximum pressure). The hydrophones, or acoustic sensors, used to measure these fields must therefore possess both a broad bandwidth (up to 100 MHz) and fine spatial sensitivity (less than 1 mm active region) in order to accurately quantify the pressure levels. The bandwidth requirement drives the design toward the use of thin (less than 25 μm), acoustically transparent films of piezoelectric polymer material, such as polyvinylidene difluoride. The electrode material used in the active region of the hydrophone must also be in the form of a thin layer, in order to prevent acoustically loading the material or altering its bandwidth characteristics. The spatial sensitivity requirement results in the use of small active apertures referred to as sensitive elements with thin connecting leads. This combination creates a hydrophone which is susceptible to damage from the action of the shock waves. The electrode material is slowly removed under shock wave action, i.e., cavitation, until the electrical connection from the sensitive element to the recording instrumentation is rendered unreliable. Thus, the primary difficulty with currently available hydrophones is the unreliability of the measurements from the sensitive element over time. Since each shock wave causes a slight change in sensitivity, it is difficult to predict whether the results of any shock wave measurement (except the first) will be valid.

The prior art hydrophones have been based on a membrane-type design, such as that discussed in U.S. Pat. No. 4,433,400. As noted above, this type of design is susceptible to damage from shock wave action. The difficulty in using this membrane-type design in a shock wave environment was addressed in U.S. Pat. No. 4,734,611, which disclosed a design which used extra membranes with conductive coatings to conduct the electrical signal from the sensitive element. These extra membranes can interfere with the acoustical properties of the hydrophone, and result in a more complicated physical construction. Thus, neither prior art design is completely adequate for calibrated measurements of high pressure lithotripter shock wave fields, either due to problems of fragility and stability of the sensitive element, or due to the complexity of the physical construction.

Another design for a hydrophone which was described as being appropriate for shock wave measurements was a needle-type design disclosed by Platte in "A Polyvinylidene Fluoride Needle Hydrophone for Ultrasonic Applications," 23 *Ultrasonics* at 113–18 (May 1985) and by Lewin in "Miniature Piezoelectric Polymer Ultrasonic Hydrophone Probes," 19 *Ultrasonics* at 213–16 (May 1981). While the needle-type design does survive better than the membrane design, it is also eventually destroyed by shock wave action. In addition, the needle-type hydrophone does not faithfully reproduce the complete acoustic pressure wave form.

Other designs for hydrophones which have been described as being useful in lithotripsy fields include that disclosed in U.S. Pat. No. 4,803,671 which is a design substantially similar to that described in U.S. Pat. No. 4,653,036 (described above). The design in the '671 patent uses a double membrane around the piezoelectric polymer membrane to provide constant liquid immersion of the sensitive element, regardless of the surrounding fluid. The double membrane design does not, however, address the problem of sensitive element destruction by shock wave action. The sensitive element design disclosed in U.S. Pat. No. 4,813,415 does not produce a pressure versus time wave form, but is merely a shaped, thin foil sensitive element which is subjected to shock waves and then optically inspected for damage. The location, diameter, depth, profile, and volume of the deformations in the foil provide information on the focusing and intensity of the shock wave.

Finally, U.S. Pat. No. 4,764,905 describes a spherically shaped piezopolymer membrane design for a hydrophone which matches the presumed wave front from a spherically focused shock wave generator. The spherically shaped design is only appropriate for spherically focused systems, and completely integrates the acoustic pressure wave form without any spatial resolution. This spherically shaped design again does not address the problem of sensitivity changes in the sensitive element caused by shock wave action on the polymer material of the electrodes.

Recently, Everbach described in "An Inexpensive Wide-Bandwidth Hydrophone for Lithotripsy Research," 87 *J. Acoustical Society of America,* at S128 (1990), the design of a membrane hydrophone with a disposable sensitive element. This design has application for shock wave measurements and claims certain attributes such as reproducible sensitivity of measurements without calibration, a disposable sensitive element, a compensating preamplifier, and a signal-limiting circuit. The design does not, however, address the problem of when to replace the sensitive element, that is, when it has been sufficiently damaged to require replacement. This design does not address the possibility of establishing an exact limit on the number of shock waves that each hydrophone may sustain without damage, since this will depend upon the intensity of the shock wave, the position of the hydrophone in the shock wave field, the conditions of the liquid used to couple the shock waves to the hydrophone and other factors. This design again leaves the operator in doubt as to the validity of the measurement results.

SUMMARY OF THE INVENTION

It is therefore an object of the present invention to provide a design for a hydrophone which eliminates or substantially reduces the above problems of the prior art devices.

It is a further object of the invention to provide a hydrophone designed with a self-monitoring feature which monitors the loss of hydrophone integrity due to shock wave action so that the hydrophone may be replaced before it produces invalid readings.

Additional objects and advantages of the invention will be set forth in part in the description which follows, and in part will be obvious from the description, or may be learned by practice of the invention. The objects and advantages of the invention may be realized and attained by means of the instrumentalities and combinations pointed out in the appended claims.

To achieve the objects and in accordance with the purpose of the invention, as embodied and broadly described herein, this invention, in one aspect includes a shock wave hydrophone device placed in a shock wave field and receiving a plurality of shock waves, the hydrophone being connected to recording instrumentation and to a resistance measurement device, the hydrophone having a self-monitoring feature, the hydrophone device including piezoelectric polymer film means, having a central sensitive element, for measuring acoustic pressure levels in the shock wave field; removable hoop means for supporting the piezoelectric polymer film means; first electrode means, deposited on the piezoelectric film means, for connecting the central sensitive element to the recording instrumentation; second electrode means, deposited on the piezoelectric film means, for providing an additional electrical connection to the central sensitive element; switching network means connected between the first electrode means and the second electrode means, for switching connections between the first electrode means and the second electrode means, the network means connecting the first electrode means in parallel with the second electrode means, the in parallel connection for outputting a signal to the recording instrumentation for sensing acoustic pressure levels in the shock wave field, the network means connecting the first electrode means in series with the second electrode means, the in series connection for outputting a signal to the resistance measurement device for measuring resistance through the series connection of the first electrode means and the second electrode means, the measured resistance being directly proportional to the number of shock waves the hydrophone device is exposed to, the piezoelectric polymer film means being replaced when the measured resistance is above a predetermined threshold level. The accompanying drawings, which are incorporated in and constitute a part of this specification, illustrate two embodiments of the invention and, together with the description, serve to explain the

DESCRIPTION OF THE PREFERRED EMBODIMENTS

Figure 1:
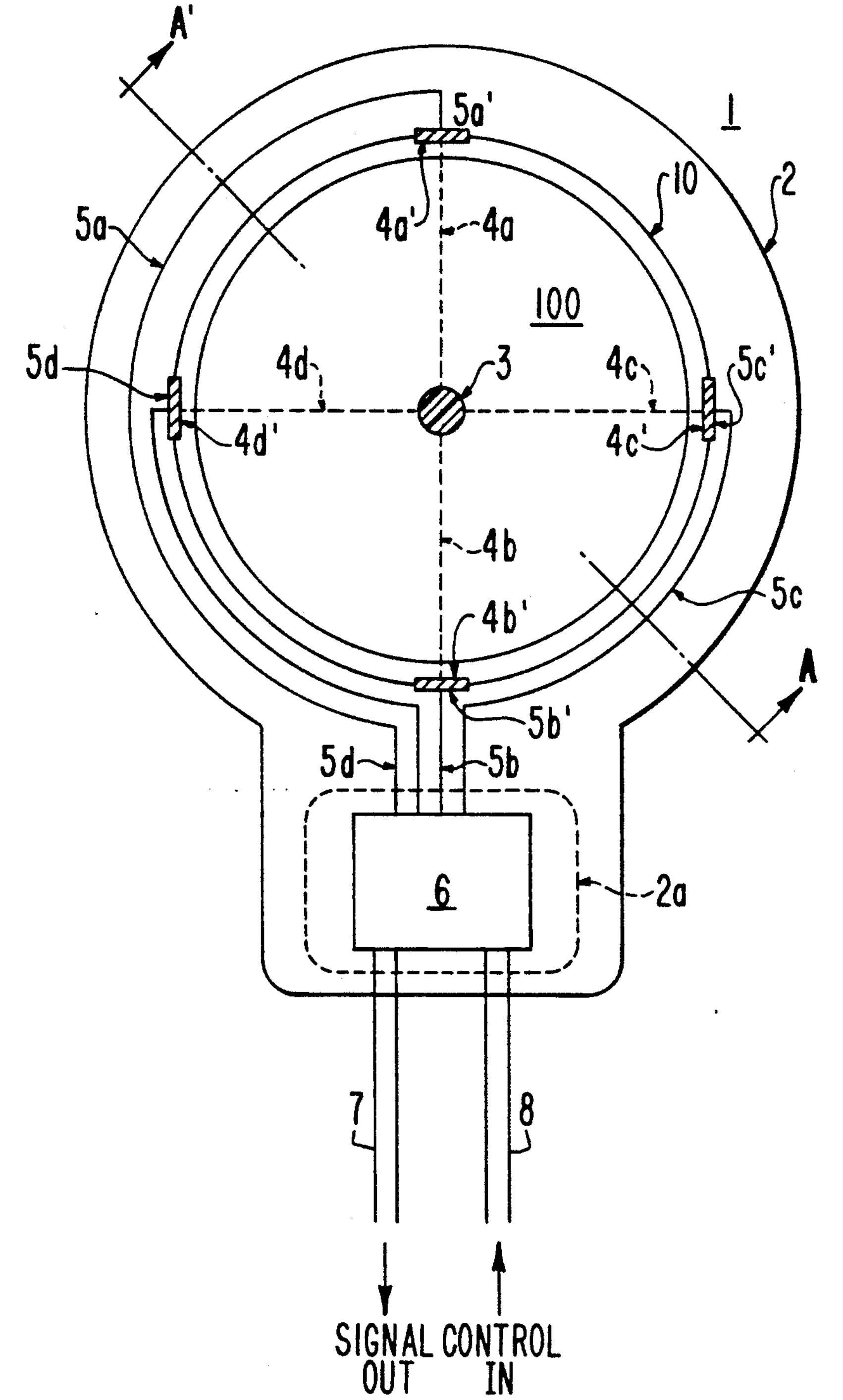
FIG. 1 is a plan view of the hydrophone with electrodes in accordance with a preferred embodiment of the present invention.

Reference will now be made in detail to the present preferred embodiments of the invention, examples of which are illustrated in the accompanying drawings in which like reference characters refer to corresponding elements.

The present invention is a membrane type hydrophone with a self-monitoring system for use in measuring shock wave fields. The present invention may also be used in any situation in which it is desirable to remotely determine the integrity of electrode leads, for instance, when performing measurements in a liquid which chemically dissolves the electrode material.

The primary cause of destruction of membrane type hydrophones presently used in lithotripters is the removal of electrode material. Hydrophone electrodes are deposited on a thin film of piezoelectric polymer film membrane, and are used for making connections from the recording instrumentation to the sensitive element of the hydrophone, which is usually in the center of the circular film membrane. One way to determine the integrity of the connection between the recording instrumentation and the sensitive element is by taking a plurality of resistance measurements along the length of an electrode lead from the central, acoustically sensitive element to the edge of the polymer film membrane. Experimental evidence shows that the measured resistance increases in direct proportion to the number of shock waves to which the hydrophone has been exposed.

The present invention is based upon the realization that monitoring the resistance of the electrode leads provides a direct measure of the integrity of the hydrophone. In order to monitor the slow destruction of the electrodes, and provide some indication of hydrophone sensitivity, an additional electrode lead may be deposited along with a main "signal" electrode lead. This additional electrode lead or "sensing" lead is of the same general dimensions as the signal electrode lead. Depending upon the design requirements, the sensing electrode lead may either connect to the signal electrode lead at the point where the sensing lead meets the sensitive element, or may connect to the sensitive element at a point opposite the signal electrode lead. During measurements, the sensing electrode lead and the signal electrode lead are shorted together, providing an additional signal path. At intervals during the measurement process, the two leads are unshorted, and the resistance through the two leads is measured. The increase in resistance is an indication of decreased sensitivity of the hydrophone. Additionally, a resistance measurement above some predetermined upper bound can be used to indicate that the hydrophone should be replaced. A simple switching network, e.g., a relay, can be used to switch the electrodes from the signal configuration (the shorted configuration) to the resistance sensing configuration (the unshorted configuration), and vice versa.

In one embodiment of the present invention, the sensing electrode and signal electrode pairs from the sensitive element are connected to the switching network, which is contained within a waterproof enclosure situated at the perimeter of the film membrane, and the switching network is actuated from a remote location, under the control of an operator.

The piezopolymer film membrane is supported by a removable hoop structure in a manner such that the film membrane can be quickly and easily replaced once it is damaged. The electrical connections from the film membrane are brought to the edge of the removable hoop in order to make contact with the switching network. The switching network is then located in a structure which mates to the removable, disposable membrane hoop structure.

In a second embodiment of the present invention, which is adaptable to existing hydrophones of the coplanar type described in the prior art, the resistance measurement can be accomplished by an ancillary movable contact which would touch the electrode material at the central active portion of the film membrane. The resistance between the center and the end of the hydrophone cable would then provide an indication of the integrity of the hydrophone.

In summary, the invention pertains to the use of a second electrode lead to provide for continuous monitoring of the condition of the first electrode along with a means for performing the monitoring. The invention also pertains to the use of a separate electrical contact mechanism for intermittent monitoring of electrode condition The monitoring means can be either a resistive measurement means, which would indicate relative performance, or a measurement means in which a go/no-go signal is given when a resistance measurement above a certain predetermined threshold value is taken indicating that the membrane should no longer be used and must be replaced.

The present invention provides a wide-bandwidth, high accuracy hydrophone, designed to accurately measure acoustic shock waves passing through a liquid medium and to provide a means to monitor the integrity of the electrode material as it is worn away by shock wave action. The wide bandwidth and accuracy of the hydrophone are derived from the use of a thin piezoelectric polymer film, such as polyvinylidene difluoride (PVDF) or co-polymers of vinylidene with tetra- or tri-fluoroethylene, in a stretched membrane design. The polymer material is available in several thicknesses, preferably 9 or 25 micrometers, and is available commercially from Pennwalt Corp. of Philadelphia, Pennsylvania or Solvay Chemical Company of Brussels, Belgium. These materials have acoustic impedances closely replicating a liquid such as water and are therefore well matched acoustically. The electrodes on both sides of the film which form the sensitive element and the electrical connection from the sensitive element to a suitable transmission line are provided by a thin metallic coating, typically deposited by a vacuum evaporation process. Masks are used to determine the pattern of the electrodes and the sensitive area.

The means for monitoring the integrity of the first electrode, as the material comprising the electrode is removed by acoustic shock wave or chemical action, is to employ an additional electrode on the film surface, extending from the sensitive element to the edge of the film in the same manner as the first "signal" electrode. This additional electrode, which acts as a "sensing" electrode, is electrically connected to the signal electrode at the region of the sensitive element. The sensing electrode may be connected electrically in parallel with the signal electrode to provide an additional electrical connection to the sensitive element, or may be used in series with the sensing electrode, to provide a test connection for monitoring electrode integrity. The electrical resistivity through the sensing and signal electrodes provides a direct measure of their integrity.

Referring to FIGS. 1-5, the shock wave hydrophone constructed in accordance with the principles of the present invention is shown and is represented generally by the numeral 1. FIG. 1 shows a plan view of a first preferred embodiment of the hydrophone 1. The hydrophone 1 consists of a supporting structure 2 and a removable hoop structure 10. The supporting structure 2 may be made from any machinable plastic product, such as polycarbonate, or may be a custom epoxy molded piece. The removable hoop structure 10 may likewise be made from either machined plastic or a molded epoxy. The size of the hydrophone 1 is determined by the size needed to avoid acoustic reflections from the structure interfering with the measurements This will depend upon the nature of the shock field being measured, but would typically be 75 mm or larger. A polymer film 100 is stretched over the removable hoop structure 10 and may be secured using a low viscosity epoxy. The thickness of the film 100 determines the bandwidth of the hydrophone 1 since the resonant frequency is determined by the half-wavelength of sound in the film 100. Another consideration in selecting the thickness of film 100 is the sensitivity needed (thicker film is more sensitive) and durability required (thicker film is also less subject to damage and puncture either by shock waves or by operator handling).

The film 100 includes a central sensitive element 3 which may be of any appropriate diameter, preferably from 0.4 mm to 1.0 mm. The diameter of central sensitive element 3 affects the sensitivity, (a larger diameter of sensitive element 3 provides greater sensitivity), spatial resolution (a smaller diameter of sensitive element 3 provides finer spatial resolution), and directivity (a smaller diameter of element 3 provides wider directivity patterns) of the hydrophone The sensitive element 3 is connected by electrode leads **4*a*, 4*b*, 4*c* and 4*d*, to contact points 4*a*', 4*b*', 4*c*' and 4*d*' at the edge of removable hoop structure 10. In FIG. 1, electrode leads 4*a* and 4*b* are on the top surface of the film 100 and electrode leads 4*c* and 4*d* are on the bottom surface of film 100. When the removable hoop structure 10 is placed on support structure 2, contact points 4*a*', 4*b*', 4*c*' and 4*d*' may contact with the corresponding contact points 5*a*', 5*b*', 5*c*' and 5*d*'. In this embodiment, electrode leads 4*a* and 4*d* are the "signal" leads and electrode leads 4*b* and 4*c*** are the "sensing" leads. The contact points 5a' to 5d' may be made of gold or other appropriate conductive material which ensures low contact resistance, and the electrode leads 4a to 4d on the polymer film 100 may be secured to the contact points 4a' to 4d' by conductive epoxy. Contact wires 5a, 5b, 5c and 5d internal to support structure 2, connect the contact points 5a', 5b', 5c' and 5d' to a switching network 6 contained within a cavity 2a of support structure 2. The exact position of cavity 2a does not substantially affect the design, although minimizing the length of wires 5a, 5b, 5c and 5d will tend to reduce electrical noise levels and cable loading of sensitive element 3. The position of cavity 2a shown in FIG. 1 is similar to that currently used in the Sonic Technologies hydrophone Type 700, introduced in January, 1990. If support structure 2 is constructed as a single molded piece, then contact wires 5a to 5d may be incorporated within support structure 2 during the molding process. The switching network 6 switches the configuration of the electrodes leads 4a to 4d between the "sensing" and "signal" modes, as described above, depending upon a signal output by control signal 8.

Figure 2A:
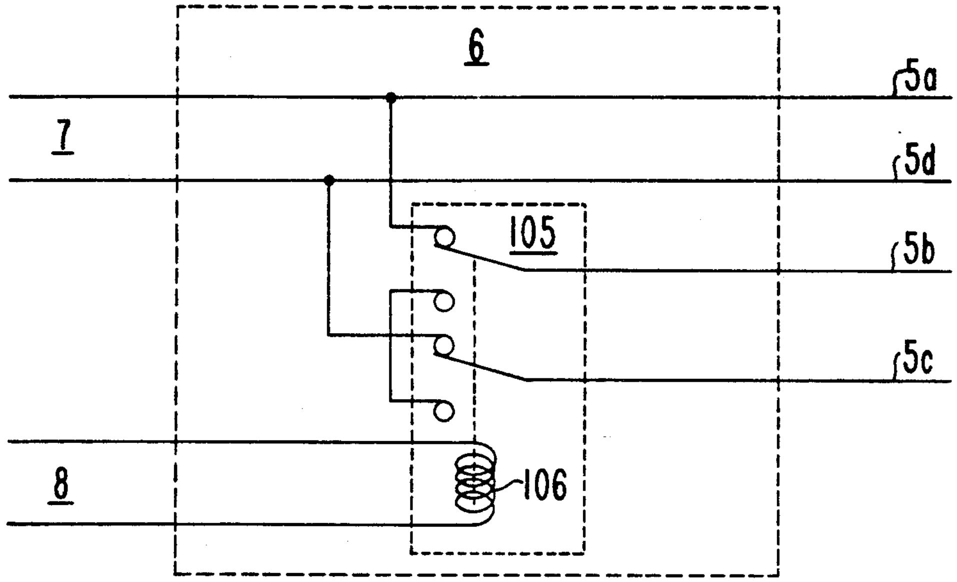
FIG. 2A is a schematic representation of the switching network and the use of a relay in performing the switching function and the connections to be made when in the signal configuration and in the resistance sensing configuration in accordance with a preferred embodiment of the present invention.

FIG. 2A is a schematic representation of the switching action of the switching network 6. In FIG. 2, a simple Single Pole Double Throw (SPDT) relay 105 is used for network 6, although network 6 may be comprised of any device which can perform a similar switching function. When a signal is output by control line 8, a coil 106 is energized and switching network 6 connects contact wires 5a and 5d in series with their corresponding sensing contact wires 5b and 5c and a signal is output on "signal out" line 7 to a resistance measurement device (not shown), such as an ohmmeter. When coil 106 is not energized, signal contact wires 5a and 5d are connected in parallel with their corresponding sensing contact wires 5b and 5c and a signal is output on "signal out" line 7 to an appropriate acoustic measurement or recording instrument (not shown). When coil 106 is energized, the exact series interconnection is as follows: contact wire 5a is connected to the top of sensitive element 3 via contact points 5a' and 4a' and electrode lead 4a ; sensitive element 3 is connected at its top surface to contact wire 5b via electrode lead 4b and contact points 4b' and 5b'; 5b is connected to 5c through the relay 105; contact wire 5c is connected to the bottom surface of sensitive element 3 via contact points 5c' and 4c' and electrode lead 4c; the bottom surface of sensitive element 3 is connected to contact wire 5d via electrode lead 4d and contact points 4d' and 5d'. In this way, the electrical integrity of the entire hydrophone assembly 1 may be checked with a single measurement of resistance.

Figure 2B:
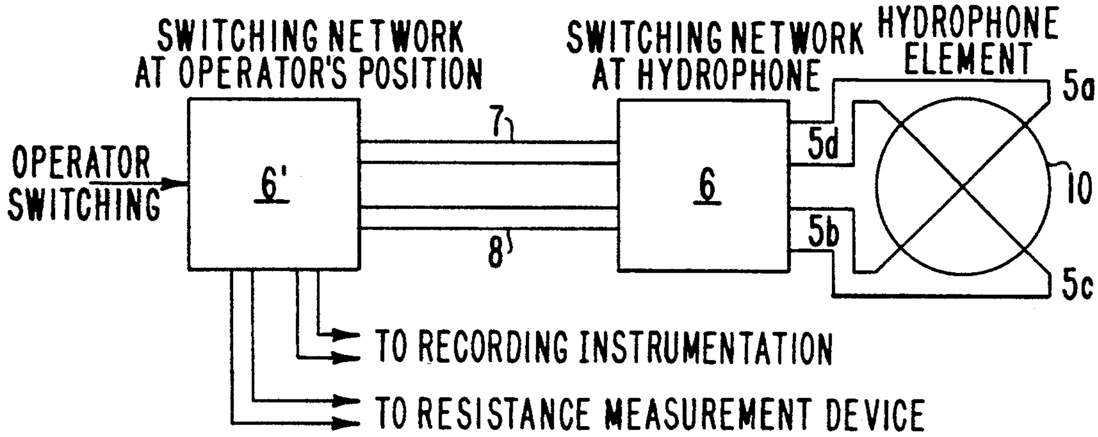
FIG. 2B is a block diagram showing the interconnections between the switching network at the hydrophone location and the complementary switching network at the operator's location in accordance with a preferred embodiment of the present invention.

As shown in FIG. 2B, at the operator's location, remote from the position of the hydrophone 1 within the shock wave field, signal line 7 may be similarly switched between the appropriate acoustic measurement or recording instrumentation (not shown) and the resistance measurement device (not shown) using, for example, another relay (not shown) energized in synchronism with switching network 6 by means of control line 8. Switching network 6 may be interconnected to complementary switching network 6' in order to connect signal line 7 between the recording instrumentation and the resistance measuring device. If it is necessary to electrically condition, i.e., amplify or limit the voltage, of the signal from sensitive element 3, then switching network 6 may be suitably modified to interpose and remove the conditioning electronics from signal line 7 by means of an additional relay circuit (not shown). It is advantageous to place the conditioning electronics within support structure 2 in cavity 2a since the current driving capabilities of film material 100 are limited and because the use of active electronics to drive signal line 7 significantly improves the signal-to-noise ratio of the system. A more complete discussion of preamplifiers used with hydrophones can be found in the paper by Lewin et al. entitled "Factors Affecting The Choice of Preamplification for Ultrasonic Hydrophone Probes," Vol. 13, No. 5, *Ultrasound Med. Biology* at 141–45 (1987).

The resistance measurement device may be comprised of either a high impedance ohmmeter or an electrical bridge circuit or other similar means. If an ohmmeter is used, then a resistance value of 100Ω or higher is used as a predetermined threshold value for an indication of damage to the electrodes. Similarly, if an electrical bridge circuit or other similar type circuit is used, such circuit must be adjusted to provide an indication of hydrophone damage when the resistance is greater than 100Ω. This value of resistance was determined from experimental tests subjecting hydrophones to shock waves while performing repeated recalibrations. The exact resistance value for a particular hydrophone must be determined by those who practice the invention since it will be a function of the intact resistance path through the hydrophone. The intact resistance path depends upon the electrode lead width and thickness, the contact point resistances, and the wiring resistance.

Figure 3A:
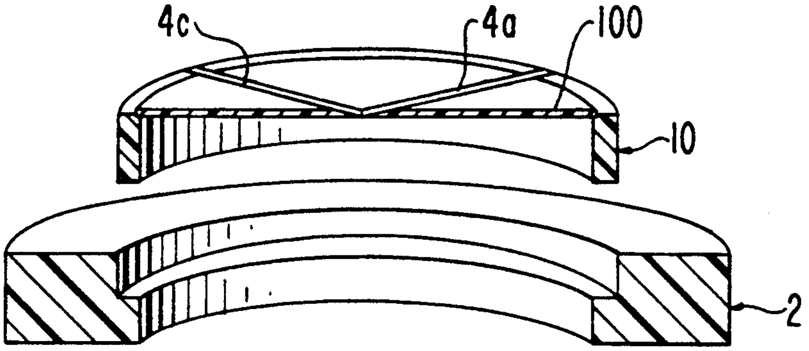
FIG. 3A is a an exploded view of the hydrophone, when constructed with a removable, membrane structure with contact points on the side of the structure in accordance with a preferred embodiment of the present invention.
Figure 3B:
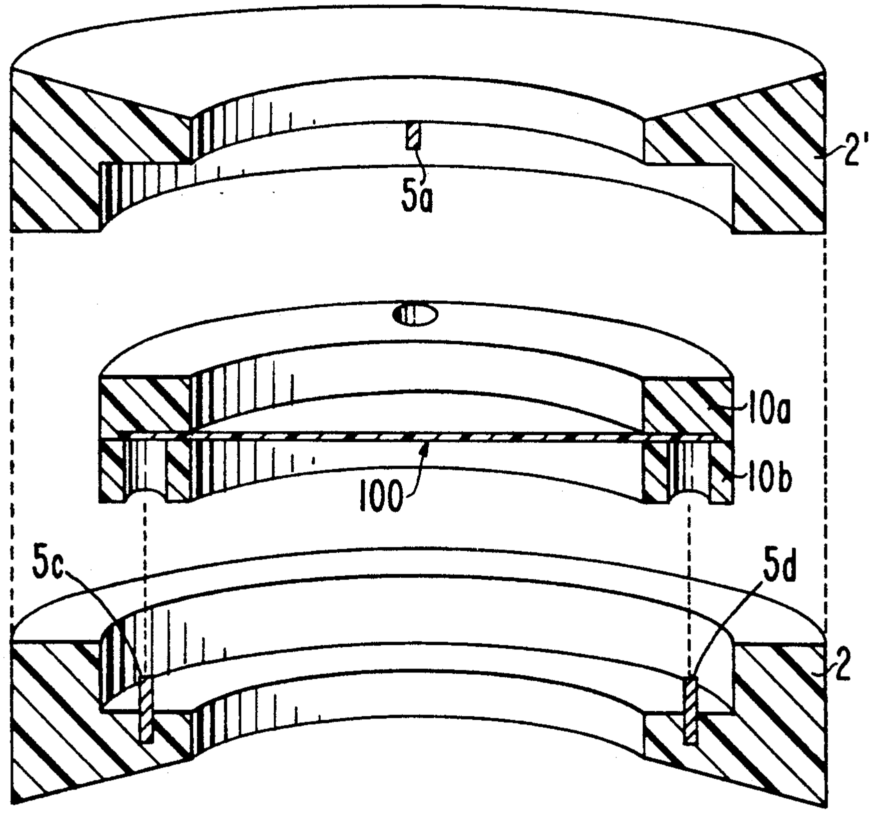
FIG. 3B is an exploded view of the hydrophone illustrating an alternative construction of the removable structure with contact points at the top and bottom of the removable structure.

FIGS. 3A and 3B are views through supporting structure 2 and removable hoop structure 10. FIG. 3A is a representation of the structure shown in FIG. 1 taken along the line A—A' of FIG. 1 and FIG. 3B shows an alternative embodiment discussed below. As shown in FIG. 3A, the removable hoop structure 10 is a single integral piece and the contact points 4a', 4b', 4c' and 4d' are on the outer rim of removable hoop 10 and contact points 5a', 5b', 5c' and 5d' are on the inner rim of the supporting structure 2. The tolerances of removable hoop 10 and support structure 2 are such that a press fit is sufficient to maintain electrical contact and keep removable hoop 10 secured within the support structure 2 during use.

In a second embodiment, shown in FIG. 3B, the removable hoop 10 is a two-part structure with the film 100 sandwiched between two halves 10a and 10b of the removable hoop 10. The contact points 5a', 5b', 5c' and 5d' are oriented vertically in this embodiment and are designed such that they make direct contact with the film electrode leads 4a, 4b, 4c, and 4d, eliminating the need for contact points 4a', 4b', 4c, and 4d'. This reduces the cost of removable hoop 10 but requires that the support structure 2 have an additional top clamping structure 2'.

Figure 4A:
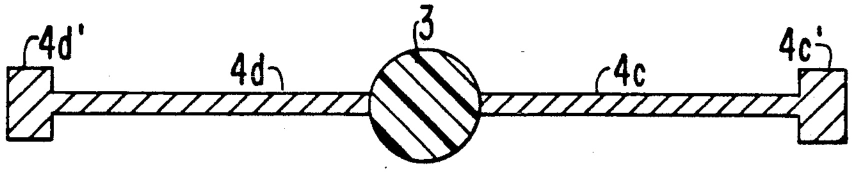
FIG. 4A is a layout of the electrode configuration of the hydrophone in accordance with the preferred embodiment of the present invention.

FIG. 4A is a representative layout of the electrode configuration as it would be used for an electrode mask or template. The electrode lead widths are typically as small as possible (0.2 mm), the sensitive element 3 is preferably between 1.0 mm to 0.25 mm in diameter, and the overall size of the polymer film membrane 100 is 100 mm in diameter. Therefore, the electrode lead length is approximately 50 mm. The electrode pattern shown is for one side only; in use, two masks are used such that the film 100 is sandwiched between them during the metal vapor deposition process. The masks would be arranged such that the electrode pattern on the opposite side would be at 90° to the one in FIG. 4A (and would form electrode leads 4*a* and 4*b*). The two patterns would overlap at the sensitive element 3.

Figure 4B:
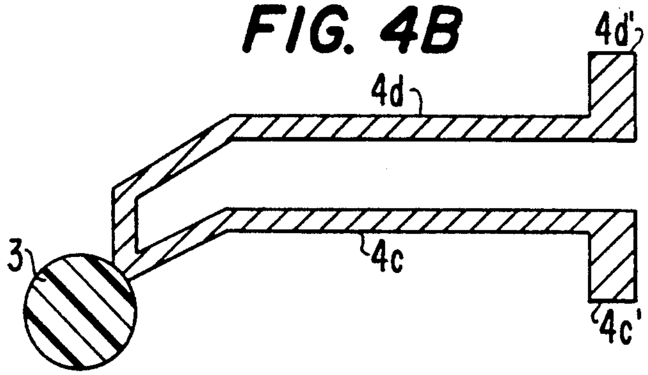
FIG. 4B is an alternative layout of the electrode configuration of the hydrophone in accordance with a second embodiment of the present invention.

FIG. 4B is an alternative layout of the electrode configuration. This embodiment would be used to reduce the length of the interconnections between the electrodes on the film 100 and switching network 6. It would thus reduce the cost of support structure 2. The masks would be arranged such that the electrode pattern on the opposite side would be a mirror image. One disadvantage of this approach is that the resistance measurement does not include the sensitive element 3.

In use, the hydrophone 10 would be placed within the operating field of a shock wave device, and positioned such that the sensitive element 3 is located at the desired field point. The hydrophone 10 would be used with suitable measurement or recording instrumentation, such as a high speed digital oscilloscope. When the shock wave device is discharged, the acoustic shock wave impinges upon the sensitive element 3, whereupon the acoustic signal is transduced into an electrical signal which is conducted to the oscilloscope. At regular intervals during the measurement sequence, and while the shock wave device is not active, the operator energizes the resistance measurement system and determines the condition of the shock wave hydrophone electrodes If the resistance has not risen above the predetermined threshold values indicated above, then the measurement process can continue with confidence that all the preceding measurement data was valid. At some point, the resistance measurement will indicate that the hydrophone 1 has sustained sufficient damage to warrant its replacement The measurement data taken between that time and the last resistance measurement should be considered suspect The removable hoop 10 is then removed and replaced, and the measurement continues until all of the desired data is gathered.

Figure 5A:
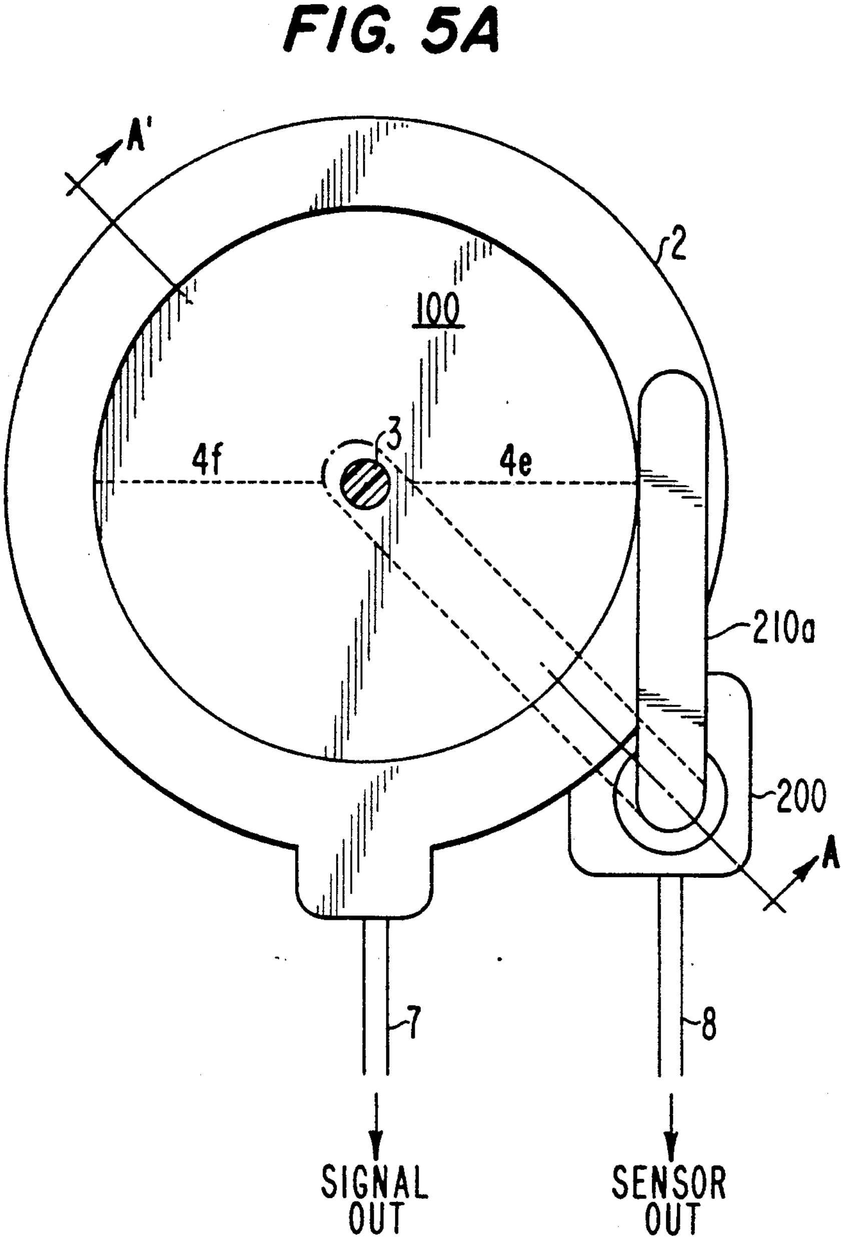
FIG. 5A is a plan view of the second embodiment of the present invention which uses an ancillary connection means to intermittently connect to the central active area of the membrane structure.
Figure 5B:
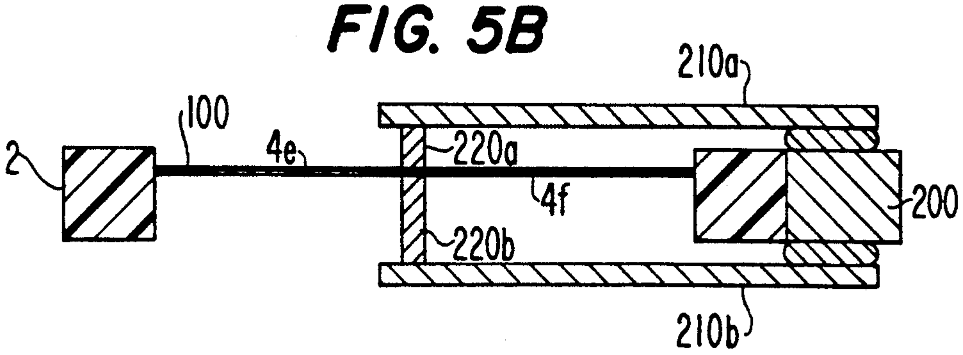
FIG. 5B is a sectional view through line A—A' of FIG. 5A.

FIGS. 5A and 5B are representations of an application of the present invention to an existing hydrophone 1 of the coplaner membrane type in which the electrode material at the central sensitive element 3 of film 100 is accessible from both sides (in the bilaminer type, it is not possible to make contact with the electrode material in the central sensitive element 3 of film 100 because it is covered by additional layers of polymer material). FIG. 5A is a plan view and FIG. 5B is a sectional view through line A—A' of FIG. 5A. In this embodiment, monitor assembly 200 is attached to the hydrophone supporting structure 2 such that monitor arms 210*a* and 210*b* can swing over the film membrane 100. When a resistance measurement is desired, the two arms 210*a* and 210*b* are positioned such that contact points 220*a* and 220*b* make contact with opposite sides of the central sensitive element 3. The resistance is monitored between the signal line 7 and the corresponding sensing line 8. Specifically, the resistance is measured from the end of signal line 7, which connects to the sensitive element 3 on the bottom of the film 100 via electrode 4*f*, to the end of the sensing line 8, which connects to contact 220*b*, and gives an indication of the integrity of the connection to the sensitive element 3. Similarly, the resistance on the upper side of the sensitive element 3 can be monitored using the lead 4*e* connected to contact 220*a*. When not in use, the monitor arms 210*a* and 210*b* can be positioned away from the central sensitive element 3 and out of the acoustic field. Thus, they would not interfere with the measurements being taken. In practice, this approach may be used in situations where it is cost prohibitive to re-design the membrane 100 of the hydrophone structure and when an adjunct means of monitoring the integrity of the hydrophone is desired.

The present invention may also be used with other methods of detection and/or display of the change in resistivity of the electrode materials. The present invention may also be used with any signal conditioning electronics which may be switched in or out of the signal line 7 in a manner consistent with the resistivity measurements as noted above. It will also be apparent to those skilled in the art that various modifications and variations can h=made in the apparatus of the present invention without departing from the scope or spirit of the invention. Thus, it is intended that the present invention cover the modifications and variations of this invention provided they come within the scope of the appended claims and their equivalents.

What is claimed is:

1. A shock wave hydrophone device placed in a shock wave field and receiving a plurality of shock waves, connected to recording instrumentation and to a resistance measurement device, said hydrophone device having a self-monitoring feature, said hydrophone device comprising:

piezoelectric polymer film means, having a central sensitive element, for measuring acoustic pressure levels in the shock wave field;

removable hoop means for supporting said piezoelectric polymer film means;

first electrode means, deposited on said piezoelectric film means, for connecting said central sensitive element to said recording instrumentation;

second electrode means, deposited on said piezoelectric film means, for providing an additional electrical connection to said central sensitive element;

switching network means, connected between said first electrode means and said second electrode means, for switching connections between said first electrode means and said second electrode means, said network means connecting said first electrode means in parallel with said second electrode means, said in parallel connection for outputting a signal to said recording instrumentation for sensing acoustic pressure levels in the shock wave field, said network means connecting said first electrode means in series with said second electrode means, said in series connection for outputting a signal to said resistance measurement device for measuring resistance through the series connection of said first electrode means and said second electrode means, said measured resistance being directly proportional to the number of shock waves said hydrophone device is exposed to, said piezoelectric polymer film means being replaced when said measured resistance is above a predetermined threshold level.

2. The shock wave hydrophone device of claim 1 wherein the piezoelectric film means is comprised of an acoustically transparent material.

3. The shock wave hydrophone device of claim 2 wherein the acoustically transparent material is comprised of polyvinylidene difluoride.

4. The shock wave hydrophone device of claim 2 wherein the piezoelectric film means has a thickness of less than 25 micrometers.

5. The shock wave hydrophone device of claim 1 wherein the switching network means is comprised of a Single-Pole-Double-Throw relay.

6. The shock wave hydrophone device of claim 2 wherein the acoustically transparent material is comprised of a co-polymer of vinylidene with tetrafluoroethylene.

7. The shock wave hydrophone device of claim 2 wherein the acoustically transparent material is comprised of a co-polymer of vinylidene with trifluoroethylene.

8. The shock wave hydrophone device of claim 1 wherein the first electrode means and the second electrode means are each comprised of a thin metallic coating deposited on said polymer film means by a vacuum evaporation process.

9. The shock wave hydrophone device of claim 1 wherein said removable hoop means is comprised of a molded epoxy material.

10. The shock wave hydrophone device of claim 1 wherein said central sensitive element has a diameter of from 0.4 mm to 1.0 mm.

11. The shock wave hydrophone device of claim 1 wherein said removable hoop means is comprised of polycarbonate.

12. The shock wave hydrophone device of claim 1 wherein the resistance measurement device is comprised of a high impedance ohmmeter.

13. The shock wave hydrophone device of claim 1 wherein the resistance measurement device is comprised of an electrical bridge circuit.

14. The shock wave hydrophone device of claim 12 wherein a predetermined threshold level of the measured resistance is 100Ω is higher and is used to determine when the hydrophone should be replaced.

15. The shock wave hydrophone device of claim 1 wherein the removable hoop means is a two-part structure including a first half and a second half and wherein said piezoelectric polymer film means is interposed between said first half and said second half.

* * * * *